United States Patent
Zhu et al.

(10) Patent No.: US 10,216,847 B2
(45) Date of Patent: *Feb. 26, 2019

(54) DOCUMENT REUSE IN A SEARCH ENGINE CRAWLER

(71) Applicant: Google Inc., Mountain View, CA (US)

(72) Inventors: Huican Zhu, San Jose, CA (US); Anurag Acharya, Campbell, CA (US); Max Ibel, Mountain View, CA (US); Howard B. Gobioff, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,634

(22) Filed: Jun. 8, 2017

(65) Prior Publication Data

US 2018/0089317 A1    Mar. 29, 2018

Related U.S. Application Data

(63) Continuation of application No. 14/245,806, filed on Apr. 4, 2014, now Pat. No. 9,679,056, which is a
(Continued)

(51) Int. Cl.
  *G06F 17/30* (2006.01)
  *G06F 9/46* (2006.01)
(52) U.S. Cl.
  CPC .............................. *G06F 17/30864* (2013.01)
(58) Field of Classification Search
  None
  See application file for complete search history.

(56) References Cited

U.S. PATENT DOCUMENTS

| 4,312,009 A | 1/1982 | Lange et al. |
| 5,521,140 A | 5/1996 | Fujioka et al. |

(Continued)

FOREIGN PATENT DOCUMENTS

| WO | 0150320 A1 | 7/2001 | |
| WO | WO 0150320 A1 * | 7/2001 | ....... G06F 17/30864 |
| WO | 0186507 A1 | 11/2001 | |

OTHER PUBLICATIONS

"Lagrange multiplier", Wikipedia, en.wikipedia.org/wiki/Lagrange_mulipliers, Jun. 3, 2011, 11 pages.
(Continued)

*Primary Examiner* — Eric C Wai
(74) *Attorney, Agent, or Firm* — Brake Hughes Bellermann LLP

(57) ABSTRACT

Systems and method are provided for setting a respective reuse flag for a corresponding document in a plurality of documents based on a query-independent score associated with the corresponding document. A document crawling operation is performed on the plurality of documents in accordance with the reuse flag for respective documents in the plurality of documents. This document crawling operation includes reusing a previously downloaded version of a respective document in the plurality of documents instead of downloading a current version of the respective document from a host computer in accordance with a determination that the reuse flag associated with the respective document meets a predefined criterion.

19 Claims, 9 Drawing Sheets

Related U.S. Application Data continuation of application No. 10/882,955, filed on Jun. 30, 2004, now Pat. No. 8,707,312, which is a continuation-in-part of application No. 10/614,113, filed on Jul. 3, 2003, now Pat. No. 7,308,643.

(56) References Cited

U.S. PATENT DOCUMENTS

| | | |
|---|---|---|
| 5,594,480 A | 1/1997 | Sato et al. |
| 5,634,062 A | 5/1997 | Shimizu et al. |
| 5,801,702 A | 9/1998 | Dolan et al. |
| 5,832,494 A | 11/1998 | Egger et al. |
| 5,898,836 A | 4/1999 | Freivald et al. |
| 6,003,060 A | 12/1999 | Aznar et al. |
| 6,012,087 A | 1/2000 | Freivald et al. |
| 6,049,804 A | 4/2000 | Burgess et al. |
| 6,068,363 A | 5/2000 | Saito et al. |
| 6,189,019 B1 | 2/2001 | Blumer et al. |
| 6,219,818 B1 | 4/2001 | Freivald et al. |
| 6,243,091 B1 | 6/2001 | Berstis et al. |
| 6,263,350 B1 | 7/2001 | Arnold et al. |
| 6,263,364 B1 | 7/2001 | Najork et al. |
| 6,269,370 B1 | 7/2001 | Kirsch et al. |
| 6,285,999 B1 | 9/2001 | Page |
| 6,321,265 B1 | 11/2001 | Najork et al. |
| 6,336,123 B2 | 1/2002 | Inoue et al. |
| 6,351,755 B1 | 2/2002 | Najork et al. |
| 6,377,984 B1 | 4/2002 | Najork et al. |
| 6,404,446 B1 | 6/2002 | Bates et al. |
| 6,418,433 B1 | 7/2002 | Chakrabarti et al. |
| 6,418,452 B1 | 7/2002 | Kraft et al. |
| 6,418,453 B1 | 7/2002 | Kraft et al. |
| 6,424,966 B1 | 7/2002 | Meyerzon et al. |
| 6,547,829 B1 | 4/2003 | Meyerzon et al. |
| 6,594,662 B1 | 7/2003 | Sieffert et al. |
| 6,631,369 B1 | 10/2003 | Meyerzon et al. |
| 6,638,314 B1 | 10/2003 | Meyerzon et al. |
| 6,701,350 B1 | 3/2004 | Mitchell et al. |
| 6,751,612 B1 | 6/2004 | Schuetze et al. |
| 6,763,362 B2 | 7/2004 | McKeeth et al. |
| 6,772,203 B1 | 8/2004 | Feiertag et al. |
| 6,836,768 B1 | 12/2004 | Hirsch et al. |
| 6,950,874 B2 | 9/2005 | Chang et al. |
| 6,952,730 B1 | 10/2005 | Najork et al. |
| 6,993,534 B2 | 1/2006 | Denesuk et al. |
| 7,043,473 B1 | 5/2006 | Rassool et al. |
| 7,047,491 B2 | 5/2006 | Schubert et al. |
| 7,080,073 B1 | 7/2006 | Jiang et al. |
| 7,089,233 B2 | 8/2006 | Osias et al. |
| 7,139,747 B1 | 11/2006 | Najork et al. |
| 7,148,991 B2 | 12/2006 | Suzuki et al. |
| 7,171,619 B1 | 1/2007 | Bianco et al. |
| 7,200,592 B2 | 4/2007 | Goodwin et al. |
| 7,231,606 B2 | 6/2007 | Bral et al. |
| 7,260,543 B1 | 8/2007 | Saulpaugh et al. |
| 7,299,219 B2 | 11/2007 | Green et al. |
| 7,308,643 B1 | 12/2007 | Zhu et al. |
| 7,310,632 B2 | 12/2007 | Meek et al. |
| 7,343,412 B1 | 3/2008 | Zimowski et al. |
| 7,346,839 B2 | 3/2008 | Sercinoglu et al. |
| 7,447,777 B1 | 11/2008 | Singh Ahuja et al. |
| 7,454,410 B2 | 11/2008 | Squillante et al. |
| 7,475,069 B2 | 1/2009 | Blackman et al. |
| 7,483,891 B2 | 1/2009 | Liu et al. |
| 7,565,423 B1 | 7/2009 | Fredricksen et al. |
| 7,627,613 B1 | 12/2009 | Dulitz et al. |
| 7,725,452 B1 | 5/2010 | Randall |
| 7,769,742 B1 | 8/2010 | Brawer et al. |
| 7,966,337 B2 | 6/2011 | Blackman et al. |
| 7,987,172 B1 | 7/2011 | Carver et al. |
| 8,042,112 B1 | 10/2011 | Zhu et al. |
| 8,161,033 B2 | 4/2012 | Randall et al. |
| 8,180,760 B1 | 5/2012 | Carver et al. |
| 8,392,396 B1 | 3/2013 | Carver et al. |
| 8,407,204 B2 | 3/2013 | Carver et al. |
| 8,639,690 B2 | 1/2014 | Haahr et al. |
| 8,707,312 B1 | 4/2014 | Zhu et al. |
| 2002/0010682 A1 | 1/2002 | Johnson et al. |
| 2002/0016729 A1 | 2/2002 | Breitenbach et al. |
| 2002/0023158 A1 | 2/2002 | Polizzi et al. |
| 2002/0052928 A1 | 5/2002 | Stern et al. |
| 2002/0065827 A1 | 5/2002 | Christie et al. |
| 2002/0073188 A1 | 6/2002 | Rawson et al. |
| 2002/0087515 A1 | 7/2002 | Swannack et al. |
| 2002/0099602 A1 | 7/2002 | Moskowitz et al. |
| 2002/0129062 A1 | 9/2002 | Luparello et al. |
| 2002/0143932 A1 | 10/2002 | Quintero et al. |
| 2002/0152201 A1 | 10/2002 | Nanavati et al. |
| 2003/0061260 A1 | 3/2003 | Rajkumar et al. |
| 2003/0126136 A1 | 7/2003 | Omoigui et al. |
| 2003/0131005 A1 | 7/2003 | Berry et al. |
| 2003/0158839 A1 | 8/2003 | Faybishenko et al. |
| 2004/0044962 A1 | 3/2004 | Green et al. |
| 2004/0064432 A1 | 4/2004 | Oetringer et al. |
| 2004/0064442 A1 | 4/2004 | Popovitch |
| 2004/0088369 A1 | 5/2004 | Yeager et al. |
| 2004/0128285 A1 | 7/2004 | Green et al. |
| 2004/0225642 A1 | 11/2004 | Squillante et al. |
| 2004/0225644 A1 | 11/2004 | Squillante et al. |
| 2005/0071766 A1* | 3/2005 | Brill .......... G06F 17/30864 715/738 |
| 2005/0086206 A1 | 4/2005 | Balasubramanian et al. |
| 2005/0102270 A1 | 5/2005 | Risvik et al. |
| 2005/0154746 A1 | 7/2005 | Liu et al. |
| 2005/0165778 A1 | 7/2005 | Obata et al. |
| 2005/0192936 A1 | 9/2005 | Meek et al. |
| 2005/0210008 A1 | 9/2005 | Tran et al. |
| 2005/0216522 A1 | 9/2005 | Gomes et al. |
| 2005/0240253 A1 | 10/2005 | Tyler et al. |
| 2006/0036605 A1 | 2/2006 | Powell et al. |
| 2006/0069663 A1 | 3/2006 | Adar et al. |
| 2006/0277175 A1 | 12/2006 | Jiang et al. |
| 2007/0156774 A1 | 7/2007 | Gomes et al. |
| 2007/0214133 A1 | 9/2007 | Liberty et al. |
| 2009/0037393 A1 | 2/2009 | Fredricksen et al. |
| 2010/0241621 A1 | 9/2010 | Randall |
| 2011/0258176 A1 | 10/2011 | Carver et al. |
| 2012/0066576 A1 | 3/2012 | Zhu et al. |
| 2012/0173552 A1 | 7/2012 | Zhu et al. |
| 2012/0317089 A1 | 12/2012 | Randall |
| 2012/0317187 A1 | 12/2012 | Fredricksen et al. |
| 2012/0323896 A1 | 12/2012 | Dulitz et al. |

OTHER PUBLICATIONS

Ali, et al., "What Changed? Measuring Document Change in Web Crawling for Search Engines", International symposium on string processing and information retrieval SPIRE 2003, Oct. 8-10, 2003, pp. 28-42.

Arasu, et al., "Searching the Web", ACM Transactions on Internet Technology (TOIT), ACM Press, vol. 1, Issue 1, Aug. 2001, pp. 2-43.

Baeza-Yates, et al., "Balancing Volume, Quality and Freshness in Web Crawling", Soft Computing Systems—Design Management and Applications, 2002, 10 pages.

Brandman, et al., "Crawler-Friendly Web Servers", ACM SIGMETRICS Performance Evaluation Review, vol. 28, Issue 2, Sep. 2000, 16 pages.

Brin, et al., "The Anatomy of a Large-Scale Hypertextual Web Search Engine", 7th International World Wide Web Conference, Brisbane, Australia, Apr. 1998, 20 pages.

Brin, et al., "The Anatomy ofa Large-Scale Hypertextual Web Search Engine", Computer Networks and ISDN Systems, vol. 30, Issue 1-7, Apr. 1998, 20 pages.

Brusilovsky, et al., "Adaptive Hypermedia: Map-based horizontal navigation in educational Hypertext", ACM Press, Jun. 2002, 10 pages.

Bullot, "A Data-Mining Approach for Optimizing Performance of an Incremental Crawler", WI '03, Oct. 2003, pp. 610-615.

Buyukkokten, "Power Browser: Efficient Web Browsing for PDAs", CHI Letters, vol. 2, Issue 1, Apr. 2000, 8 pages.

(56) References Cited

OTHER PUBLICATIONS

Cho, "Crawling the Web: Discovery and Maintenance of Large-Scale Web Data", PhD Thesis, Dept. of Computer Science, Stanford University, Nov. 2001, 188 pages.
Cho, "Effective Page Refresh Policies for Web Crawlers", ACM Transactions on Database Systems, vol. 28, No. 4, Dec. 2003, pp. 390-426.
Cho, et al., "Efficient Crawling Through URL Ordering", Computer Networks and ISDN Systems, vol. 30, Issues 1-7, Apr. 1998, pp. 161-172.
Cho, et al., "Estimating Frequency of Change", Stanford University, 2003, pp. 256-290.
Cho, "Synchronizing a Database to Improve Freshness", MOD 2000, Dallas, TX, Jun. 2000, pp. 117-128.
Cho, et al., "The Evolution of the Web and Implications for an Incremental Crawler", Proceedings of the 26th VLDB Conf., Cairo, Egypt, 2000, pp. 200-209.
Coffman, "Optimal Robot Scheduling for Web Search Engines", Tech. Rep. RR3317, 1997, 19 pages.
Douglis, et al., "Rate of Change and Other Metrics: A Live Study of the World Wide Web,", USENIX Symposium on Internetworking Technologies and Systems, Monterey CA, Dec. 1997, pp. i and 1-13.
Douglis, et al., "The AT&T Internet Difference Engine: Tracking and Viewing Changes on the Web", World Wide Web, vol. 1, No. 1, Mar. 1998, pp. 27-44.
Fetterly, et al., "A Large-Scale Study of the Evolution of Web Pages", May 20-24, 2003, pp. 669-678.
Haveliwala, "Topic-Sensitive PageRank", In Proceedings of the 11th International World Wide Web Conference, May 2002, 10 pages.
Henzinger, "Web Information Retrieval—an Algorithmic Perspective", ESA 2000, LNCS 1879, 2000, 8 pages.
Heydon, "Mercator: A Scalable, Extensible Web Crawler", World Wide Web, vol. 2, No. 4, Dec. 1999, pp. 219-229.
Hirai, et al., "WebBase: A Repository of Web Pages", Computer Networks, vol. 33, Issues 1-6, Jun. 2000, pp. 277-293.
Introna, "Defining the Web: The Politics of Search Engines,", Computer, vol. 22, Issue 1, Jan. 2000, pp. 54-62.
Jeh, et al., "Scaling Personalized Web Search", Proceedings of the 12th international conference on World Wide Web, 2003, 35 pages.
Kamvar, et al., "Exploiting the Block Structure of the Web for Computing PageRank", Stanford Univ. Technical Report, 2003, 13 pages.
Klemm, "WebCompanion: A Friendly Client-Side Web Prefetching Agent", IEEE Transactions on Knowledge and Data Engineering, vol. 11, No. 4, Jul./Aug. 1999, pp. 577-594.
Lee, "Intelligent Agents for Matching Information Providers and Consumers on the World-Wide-Web", Proc. of the 13th Annual Hawaii International Conf. on System Sciences, 1997, 11 pages.
Najork, "Breadth-First Search Crawling Yields High-Quality Pages", WWW10, 2001, pp. 114-118.
Najork, "High-Performance Web Crawling", COMPAQ, Systems Research Center, Sep. 26, 2001, 26 pages.
Nekrestyanov, "Building Topic-Specific Collections with Intelligent Agents", IS&N '99, Proc. of the 6th International Conf. on Intelligence and Services in Networks: Paving the Way for an Open Service Market, Springer-Verlag, 1999, 13 pages.
Pandey, "Monitoring the Dynamic Web to Respond to Continuous Queries", WWW2003, Budapest, Hungary, May 20-24, 2003, pp. 659-668.
Pretto, "A Theoretical Analysis of Google's Pagerank", Sep. 2002, 14 pages.
Risvik, "Search Engines and Web Dynamics", Computer Networks 39, 2002, pp. 289-302.
Shkapenyuk, et al., "Design and Implementation of a High Performance Web Crawler", Proceedings of the 18th International Conference on Data Engineering ICDE, San Jose, CA, Mar. 1, 2002, pp. 357-368.
Suel, et al., "ODISSEA: A Peer to Peer: Architecture for Scalable Web Search and Information Retrieval", In 6th International Workshop on the Web and Databases WebMD, San Diego CA, Jun. 12-13, 2003, 6 pages.
Wolf, et al., "Optimal Crawling Strategies for Web Search Engines", ACM, May 2002, pp. 136-147.

* cited by examiner

DOCUMENT REUSE IN A SEARCH ENGINE CRAWLER

CROSS-REFERENCE TO RELATED APPLICATIONS

This application is a Continuation of, and claims priority to, U.S. patent application Ser. No. 14/245,806, filed on Apr. 4, 2014, entitled "Document Reuse in a Search Engine Crawler", now U.S. Pat. No. 9,679,056, which is a continuation of U.S. patent application Ser. No. 10/882,955, filed on Jun. 30, 2004, entitled "Document Reuse in a Search Engine Crawler," now U.S. Pat. No. 8,707,312, which is a continuation-in-part of U.S. patent application Ser. No. 10/614,113, filed on Jul. 3, 2003, entitled "Anchor Tag Indexing In a Web Crawler System," now U.S. Pat. No. 7,308,643, the disclosures of which are incorporated by reference herein in their entirety.

BACKGROUND

This application is related to U.S. Pat. No. 8,042,112, entitled "Scheduler for Search Engine Crawler," which is hereby incorporated by reference herein in its entirety.

This application is related to U.S. patent application Ser. No. 13/031,011, entitled "Scheduler for a Search Engine Crawler," filed Feb. 18, 2011, which application is hereby incorporated by reference herein in its entirety.

TECHNICAL FIELD

The disclosed embodiments relate generally to search engine crawlers for use in computer network systems, and in particular to a scheduler for a search engine crawler.

BACKGROUND

A search engine is a tool that identifies documents, typically stored on hosts distributed over a network, satisfying search queries specified by users. Web search engines work by storing information about a large number of web pages (hereinafter also referred to as "pages" or "documents"), which they retrieve from the World Wide Web (WWW). These documents are retrieved by a web crawler. The web crawler follows links found in crawled documents so as to discover additional documents to download. The contents of the downloaded documents are indexed, mapping the terms in the documents to identifiers of the documents. The resulting index is configured to enable a search to identify documents matching the terms in search queries. Some search engines also store all or part of the document itself, in addition to the index entries. When a user submits a search query having one or more terms, the search engine searches the index for documents that satisfy the query, and provides a listing of matching documents, typically including for each listed document the URL, the title of the document, and in some search engines a portion of document's text deemed relevant to the query.

To keep within the capacity limits of the crawler, automated selection mechanisms are needed to determine not only which web pages to crawl, but which web pages to avoid crawling. For instance, as of the end of 2003, the WWW is believed to include well in excess of 10 billion distinct documents or web pages, while a search engine may have a crawling capacity that is less than half as many documents.

SUMMARY

In an embodiment of the invention, a search engine crawler includes a scheduler for determining which documents to download from their respective host servers. Some documents, known to be stable based on one or more record from prior crawls, are reused from a document repository. A reuse flag is set in a scheduler record that also contains a document identifier, the reuse flag indicating whether the document should be retrieved from a first database, such as the World Wide Web, or a second database, such as a document repository. A set of such scheduler records are used during a crawl by the search engine crawler to determine which database to use when retrieving the documents identified in the scheduler records.

One aspect of the present disclosure provides a method in which, at a computing system having one or more processors and memory storing one or more programs executed by the one or more processors, a respective reuse flag is set for a corresponding document in a plurality of documents based on a query-independent score associated with the corresponding document. A document crawling operation is performed on the plurality of documents in accordance with the reuse flag for respective documents in the plurality of documents. This document crawling operation includes reusing a previously downloaded version of a respective document in the plurality of documents instead of downloading a current version of the respective document from a host computer in accordance with a determination that the reuse flag associated with the respective document meets a predefined criterion. In some embodiments, setting the respective reuse flag is based, at least in part, on a document score associated with the corresponding document.

In some embodiments, the method further comprises retrieving a plurality of records corresponding to prior scheduled crawls of a respective document in the plurality of documents, each record comprising a set of entries, the set of entries comprising a document identifier, a crawl time, a crawl type, and a content summary. The plurality of records includes (i) a first record, the first record comprising a first document identifier, a first document score, a first crawl time, a first crawl type, and a first content summary, and (ii) a second record, the second record comprising a second document identifier, a second document score, a second crawl time, a second crawl type, and a second content summary. The first document identifier and the second document identifier correspond to the respective document. The reuse flag for the respective document is set in accordance with a comparison of the first content summary with the second content summary. In some embodiments, the reuse flag for the respective document is set to a first state when the first content summary and the second content summary differ. In some embodiments, the reuse flag for the respective document is set to a first state when based on a comparison of the first crawl type to the second crawl type. In some embodiments the reuse flag for the respective document is set to the first state when the first crawl type and the second crawl type are both equal to a predefined value.

In some embodiments, there is retrieved, from a first database, at least a subset of the contents of a first document in the plurality of documents, the first document corresponding to a document identifier in a first scheduler record, the first scheduler record including a reuse flag for the first document set to a first state. There is retrieved, from a second database, at least a subset of the contents of a second document in the plurality of documents, the second document corresponding to a document identifier in a second scheduler record, the second scheduler record including a reuse flag for the second document set to a second state. In such exemplary embodiments, the first and second databases are not the same and the second database stores content from previously crawled documents, including the second document. In some embodiments, the first database is a set of servers and the set of servers is interconnected by a network. In some embodiments the first database is the World Wide Web and the first database comprises a subset of the World Wide Web. In some embodiments, the method further comprises adding at least a subset of the contents of the first document to the second database.

Another aspect provides a computer system comprising one or more processors, memory storing data and one or more programs for execution by the one or more processors. The stored data and one or more programs comprising instructions for setting a respective reuse flag for a corresponding document in a plurality of documents based on a query-independent score associated with the corresponding document and for performing a document crawling operation on the plurality of documents in accordance with the reuse flag for respective documents in the plurality of documents. The document crawling operation comprises reusing a previously downloaded version of a respective document in the plurality of documents instead of downloading a current version of the respective document from a host computer in accordance with a determination that the reuse flag associated with the respective document meets a predefined criterion. In some embodiments, the respective reuse flag is based, at least in part, on a document score associated with the corresponding document. In some embodiments, the stored data and one or more programs comprises instructions for retrieving a plurality of records corresponding to prior scheduled crawls of a respective document in the plurality of documents, each record comprising a set of entries, the set of entries comprising a document identifier, a crawl time, a crawl type, and a content summary. The plurality of records includes a first record, the first record comprising a first document identifier, a first document score, a first crawl time, a first crawl type, and a first content summary, and a second record, the second record comprising a second document identifier, a second document score, a second crawl time, a second crawl type, and a second content summary. The first document identifier and the second document identifier correspond to the respective document. The reuse flag for the respective document is set in accordance with a comparison of the first content summary with the second content summary. In some embodiments the reuse flag for the respective document is set to a first state when the first content summary and the second content summary differ. In some embodiments the reuse flag for the respective document is set to a first state when based on a comparison of the first crawl type to the second crawl type. In some embodiments the reuse flag for the respective document is set to the first state when the first crawl type and the second crawl type are both equal to a predefined value. In some embodiments, the stored data and one or more programs further comprise instructions for retrieving, from a first database, at least a subset of the contents of a first document in the plurality of documents, the first document corresponding to a document identifier in a first scheduler record, the first scheduler record including a reuse flag for the first document set to a first state and retrieving, from a second database, at least a subset of the contents of a second document in the plurality of documents, the second document corresponding to a document identifier in a second scheduler record, the second scheduler record including a reuse flag for the second document set to a second state. The first and second databases are not the same and the second database stores content from previously crawled documents, including the second document.

Another aspect of the present disclosure provides a computer-readable medium having stored thereon instructions which, when executed by one or more processors of a computer system, cause the one or more processors to perform the operations of setting a respective reuse flag for a corresponding document in a plurality of documents based on a query-independent score associated with the corresponding document and performing a document crawling operation on the plurality of documents in accordance with the reuse flag for respective documents in the plurality of documents. The document crawling operation includes reusing a previously downloaded version of a respective document in the plurality of documents instead of downloading a current version of the respective document from a host computer in accordance with a determination that the reuse flag associated with the respective document meets a predefined criterion. In some embodiments, setting the respective reuse flag is based, at least in part, on a document score associated with the corresponding document.

DESCRIPTION OF EMBODIMENTS

Overview of Crawler System with Centralized URL Scheduler

Figure 1A:
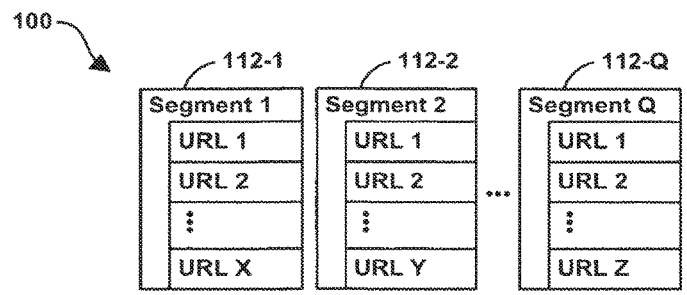
FIG. 1A illustrates a data structure for storing URLs.

FIG. 1A illustrates a data structure 100 for storing document identifiers (e.g., web page URLs) into segments 112. In some embodiments, the data structure 100 includes a sequence of segments 112a, . . . , 112n. Each segment 112 includes a number of URLs representing a portion of the web page address space that has been (or will be) used by a web crawler system.

Figure 1B:
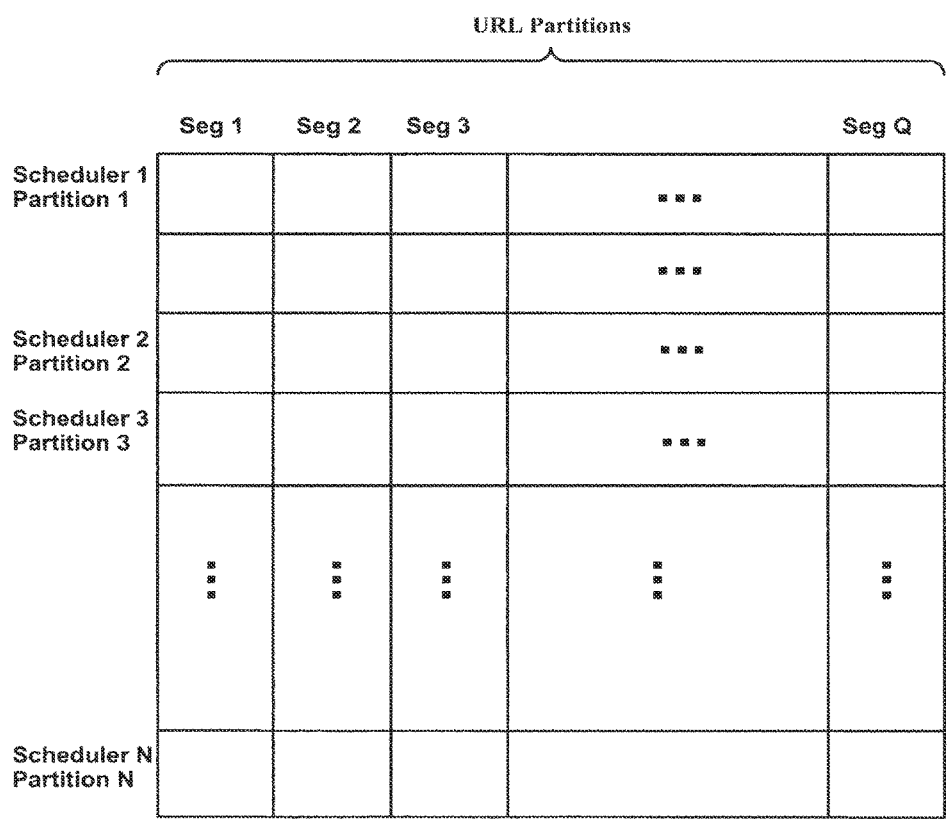
FIG. 1B illustrates the assignment of schedulers to URL partitions containing one or more segments.

FIG. 1B illustrates the assignment of a set of URL schedulers to segments of a data structure. Note that each scheduler 1, . . . , N is assigned to a URL partition, which includes a portion of each of the segments 1 to Q. For Example, scheduler 1 will schedule URLs contained in segments 1, . . . , Q, which collectively form URL partition 1. The schedulers 302 are described more fully with respect to FIG. 3.

Figure 2:
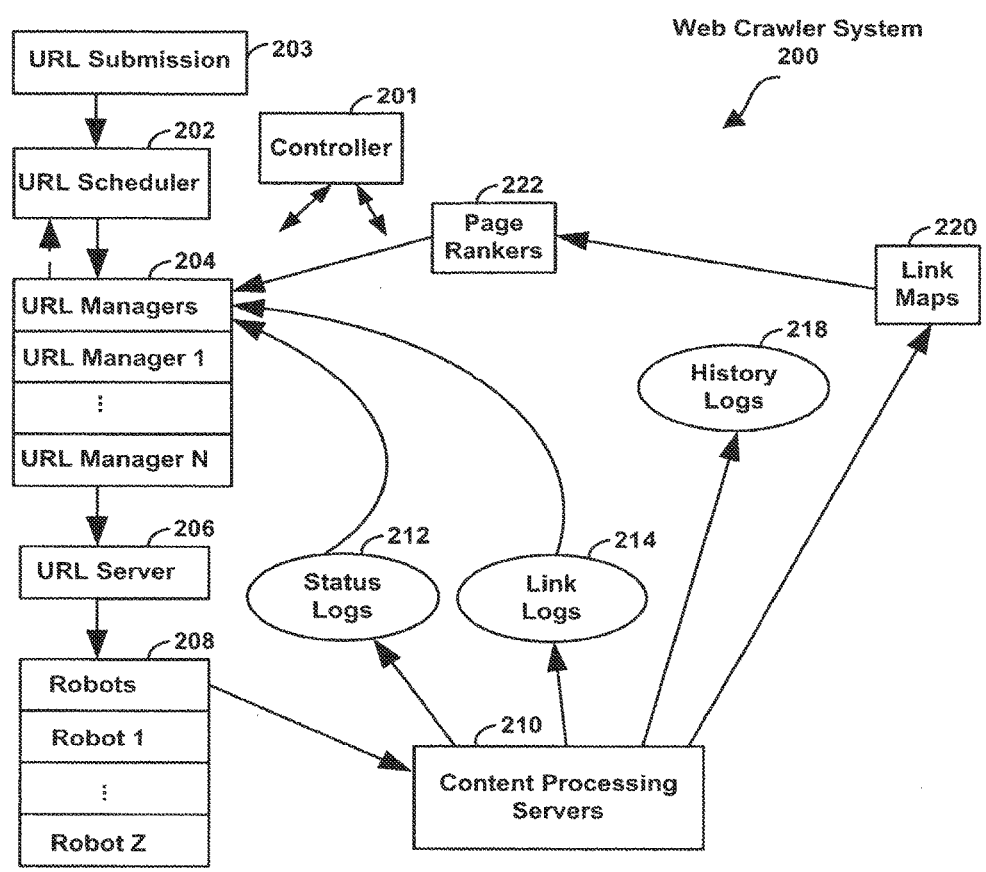
FIG. 2 is a block diagram illustrating a web crawler system for processing crawled web pages including a central URL scheduler.

FIG. 2 is a simplified block diagram of a web crawler system 200, which crawls URLs stored in the data structure 100. In some embodiments, there are a number of different URL sources used to populate the data structure 100, including direct submission 203 of URLs by users of the search engine system 200, or submissions (e.g., time-based submissions) from third parties who have agreed to provide links to documents as they are published, updated or changed. Another source of URLs is through discovery of outgoing links on crawled pages.

The URL scheduler 202 determines which URLs will be crawled in each epoch, and stores that information in the data structure 100. In some embodiments, the URL scheduler 202 allocates URLs to segments of the data structure, where the segments correspond to the epochs. In these embodiments, the URL scheduler 202 also determines which URLs within each segment are to be crawled, as will be described in more detail below.

The controller 201 selects a segment 112 for crawling. The selected segment 112, is referred to hereinafter as the "active segment." Typically, at the start of each epoch, the controller 201 selects a different segment 112 as the active segment so that, over the course of several epochs, all the segments 112a, . . . , n are selected for crawling in a round-robin manner.

A query-independent score (also called a document score) is computed for each URL by URL page rankers 222. The page rankers 222 compute a page importance score for a given URL. In some embodiments, the page importance score is computed by considering not only the number of URLs that reference a given URL, but also the page importance score of such referencing URLs. Page importance score data is provided to URL managers 204, which pass a page importance score for each URL to URL server 206, robots 208, and content processing servers 210. One example of a page importance score is PageRank, which is used the page importance metric used in the Google search engine. An explanation of the computation of PageRank is found in U.S. Pat. No. 6,285,999, which is incorporated by reference herein in its entirety.

From time to time, the URL server 206 requests URLs from the URL managers 204. In response, the URL managers 204 provide the URL server 206 with URLs obtained from data structure 100. The URL server 206 then distributes URLs from the URL managers 204 to crawlers 208 (hereinafter also called "robots" or "bots") to be crawled. A robot 208 is a server that retrieves documents at the URLs provided by the URL server 206. The robots 208 use various known protocols to download pages associated with URLs (e.g., HTTP, HTTPS, Gopher, FTP, etc.).

Pages obtained from URLs that have been crawled by robots 208 are delivered to content processing servers 210, which perform a number of tasks. In some embodiments, these tasks include indexing the content of the pages, generating records of the outbound links in the pages, detecting duplicate pages, and creating various log records to record information about the crawled pages. In one embodiment, these log records are stored in log files, including link logs 214, history logs 218, and status logs 212. The link logs 214 include a link record for each document obtained from a URL by a robot 208 and passed to the content processing servers 210. Each link log 214 record identifies all the links (e.g., URLs, also called outbound links) that are found in the document associated with the record and the text that surrounds the link. The information in the link logs 214 is used by the content processing servers 210 to create link maps 220. The records in the link map 220 are similar to records in the link logs 214 with the exception that text is stripped and the records are keyed by a "fingerprint" of the normalized value of the source URL. In some embodiments, a URL fingerprint is a 64-bit integer determined by applying a hash function or other one way function to a URL. The bit-length of the URL fingerprint may be longer or shorter than 64 bits in other embodiments. The records in each link map 220 may optionally be sorted or keyed by a fingerprint. The link maps 220 are used by the page rankers 222 to adjust the page importance score of URLs within data structure 100. Preferably, such page importance scores persist between epochs.

URL Scheduling

Overview of Web Crawler System with URL Schedulers

Figure 3:
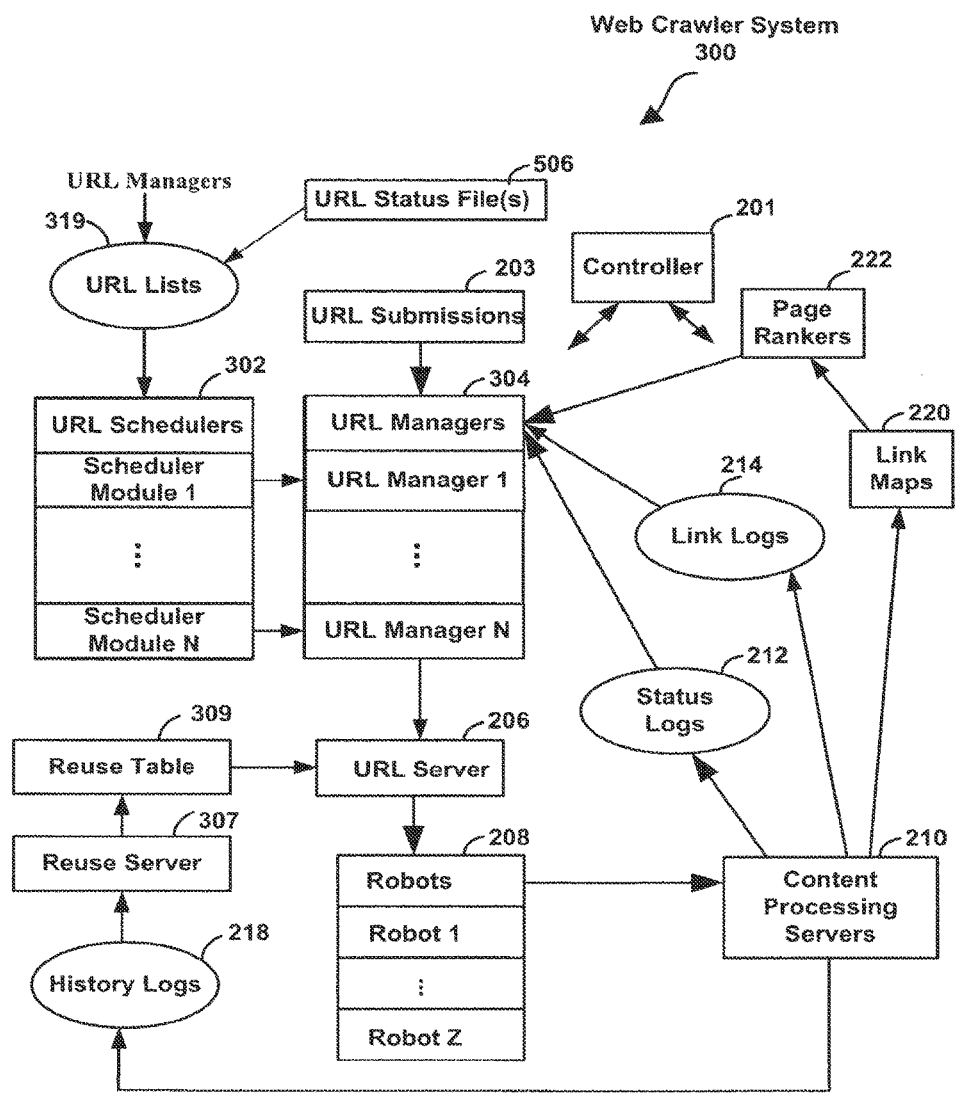
FIG. 3 is a block diagram illustrating a web crawler system for processing web pages including a set of URL schedulers.

FIG. 3 is a simplified block diagram illustrating a web crawler system 300 for processing web pages including URL schedulers 302. Note that portions of the web crawler system 300 not directly involved in the operation of the URL schedulers 302 and URL managers 304 are represented by the content processing servers 210. Also, note that the controller 201, page rankers 222, content processing servers 210, URL, server 206 and robots 208 operate in a manner previously described with respect to the web crawler system 200 shown in FIG. 2. In contrast to the web crawler system 200, which employs a centralized URL scheduler 202, the web crawler system 300 employs a number of URL schedulers 302-1, . . . , 302-N, which are run prior to each segment being crawled. Each scheduler 302 is coupled to a corresponding URL manager 304-1, . . . , 304-N, which is responsible for managing the distribution of URLs to URL server 306. The URL schedulers 302 are adapted to receive URL lists 319 containing URLs to be scheduled for crawling. The URL lists 319 are generated, at least in part, from URL status tables 505, as described below.

URL Reuse

Referring to the lower half of FIG. 3, a reuse server 307 populates a reuse table 309 with historical data received from history logs 218 generated by the content processing servers 210 during previous crawls. The reuse table 309 identified URLs that are to be retrieved from data repositories rather than downloaded from the WWW in the next crawl. In some embodiments, the decision to reuse a URL is based on whether the content of the document corresponding to the URL has changed in the last N crawls. For example, if a content checksum for a document remains unchanged over the last N crawls, then the URL associated with the document will be included in the reuse table 309 along with the number of days since the document was last modified. In other embodiments, a limit is placed on the number of times a particular URL is reused. For example, after a URL has been reused three times in a row it is no longer a candidate for reuse. In still other embodiments, the top x % (e.g., 2%) of URLs based on page importance scores will not be reused because of the importance that the search index contain the most recent version of these documents, as well as the high probability that their content will change between crawls. Table I below is an example of a reuse table 309 for a scheduler system 300.

TABLE I

Reuse Table Example

| URL Record No. | URL Fingerprint (FP) | Reuse Type | If Modified Since . . . |
|---|---|---|---|
| 1 | 2123242 | REUSE | |
| 2 | 2323232 | REUSE IF NOT MODIFIED SINCE | Feb. 5, 2004 |
| 3 | 3343433 | DOWNLOAD | |
| . | . | . | . |
| . | . | . | . |
| . | . | . | . |

In some embodiments, the reuse table 309 includes a record for each URL and each URL record includes at least three fields. The first field includes the URL fingerprint (FP) and the second field includes a Reuse Type flag indicating whether the URL associated with the URL FP is to be reused, or downloaded, or conditionally reused. If the Reuse Type flag is set to REUSE, then the document associated with the URL FP will be retrieved from a data repository. If the Reuse Type flag is set to DOWNLOAD, then the document will be downloaded in the next crawl cycle. If the Reuse Type Flag is set to REUSE IF NOT MODIFIED SINCE, the third field specifies a date or a date and time or a timestamp value. When the Reuse Type Flag is set to this conditional value, and the document associated with the URL was "modified since" the time and date specified in the reuse table 309, then the document will be downloaded by a robot in the next crawl cycle. Otherwise, the document associated with URL will be retrieved form a data depository. The reuse/download scheduling process is described more fully with respect to FIGS. 4A-4D.

Figure 4A:
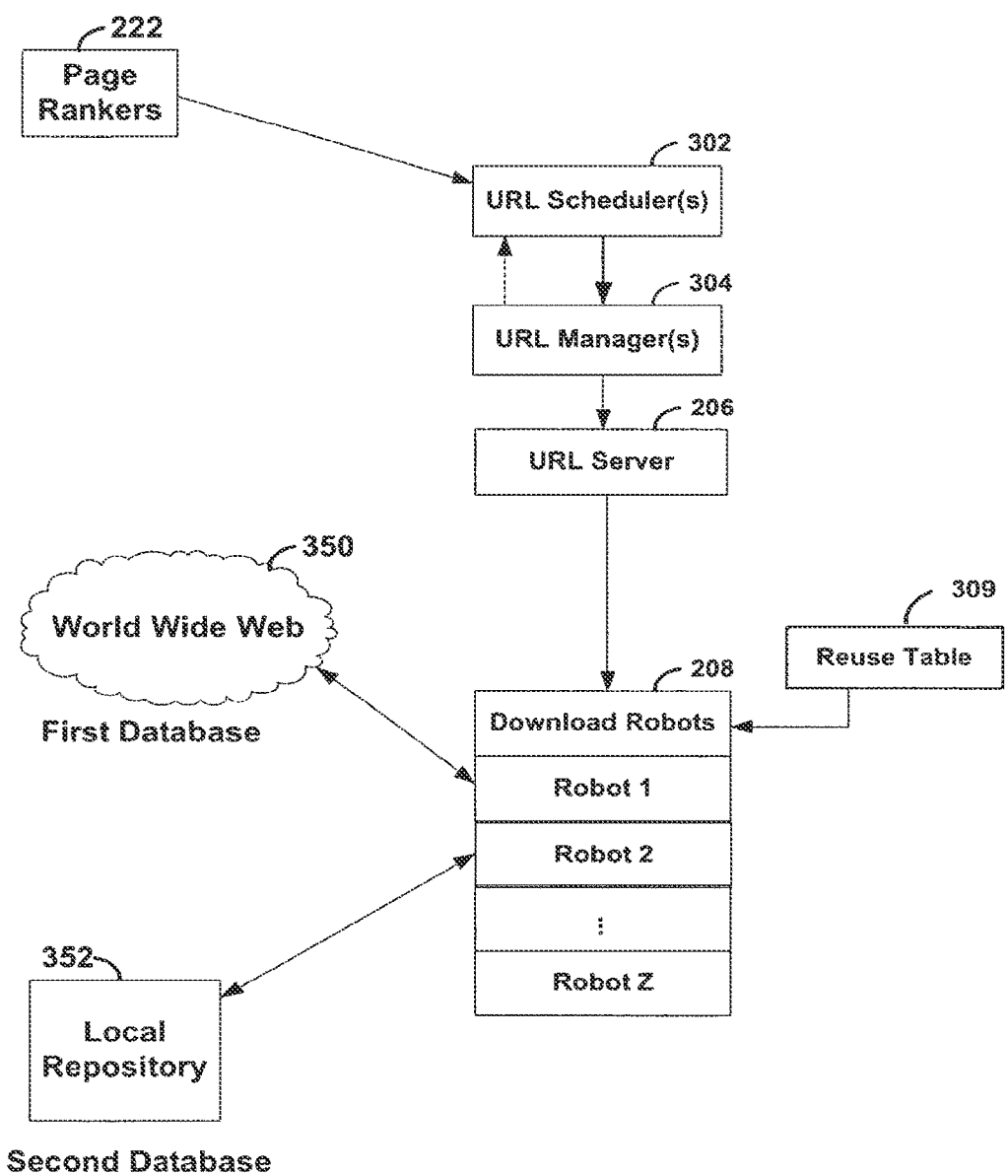
FIG. 4A is a conceptual block diagram of a web crawler system.

FIG. 4A is a conceptual diagram of a web crawler system. All of the components of the system have been previously described, except the two databases 350, 352. The first database 350 is the World Wide Web or other network of documents, and thus is not part of the web crawler system. The second database 352 is a local repository of documents previously downloaded from the first database 350, during either the current or previous crawls. The robots 208 crawl scheduled documents, the addresses or URLs of which are provided to the robots by the URL Server 206. Each scheduled document is crawled either from the first database 350 or the local second database 352, based on information specified in the reuse table 309.

Figure 4B:
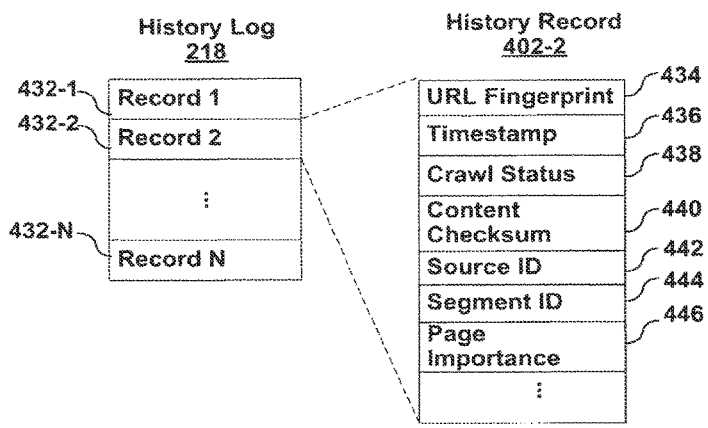
FIG. 4B is a block diagram of a history log file.

FIG. 4B depicts a portion of the data structure of a history log file 218 and a history log record 432. In some embodiments, each history log record 432 contains only a subset of the fields shown in FIG. 4B, and may contain other fields as well. In the embodiment shown, the history log file 218 contains a set of history log records 432, each of which stores information concerning a particular crawl attempt of a particular document. Each history record 432 includes the following fields:

URL fingerprint 434, which is obtained by applying a hash function or fingerprint function to the document's URL;

timestamp 436, indicating the date and time of the download or crawl attempt;

crawl status 438, indicating whether the crawl attempt was a success or resulted in an error;

content checksum 440, which contains a checksum of the contents of the page if the crawl attempt was successful;

source ID 442, indicating whether the document was reused (i.e., accessed from the local document repository), or downloaded (or attempted to be downloaded);

segment identifier 444, which indicates the segment to which the document is assigned; and page importance 446, which is the page importance score assigned to the document (by the page rankers) at the time of the crawl attempt.

Some of the fields of the history record 432 are unused, or undefined, in the event that the crawl attempt is unsuccessful, or if the crawl attempt is a reuse of the document from a local document repository.

Reuse/Download Scheduling Process

Figure 4C:
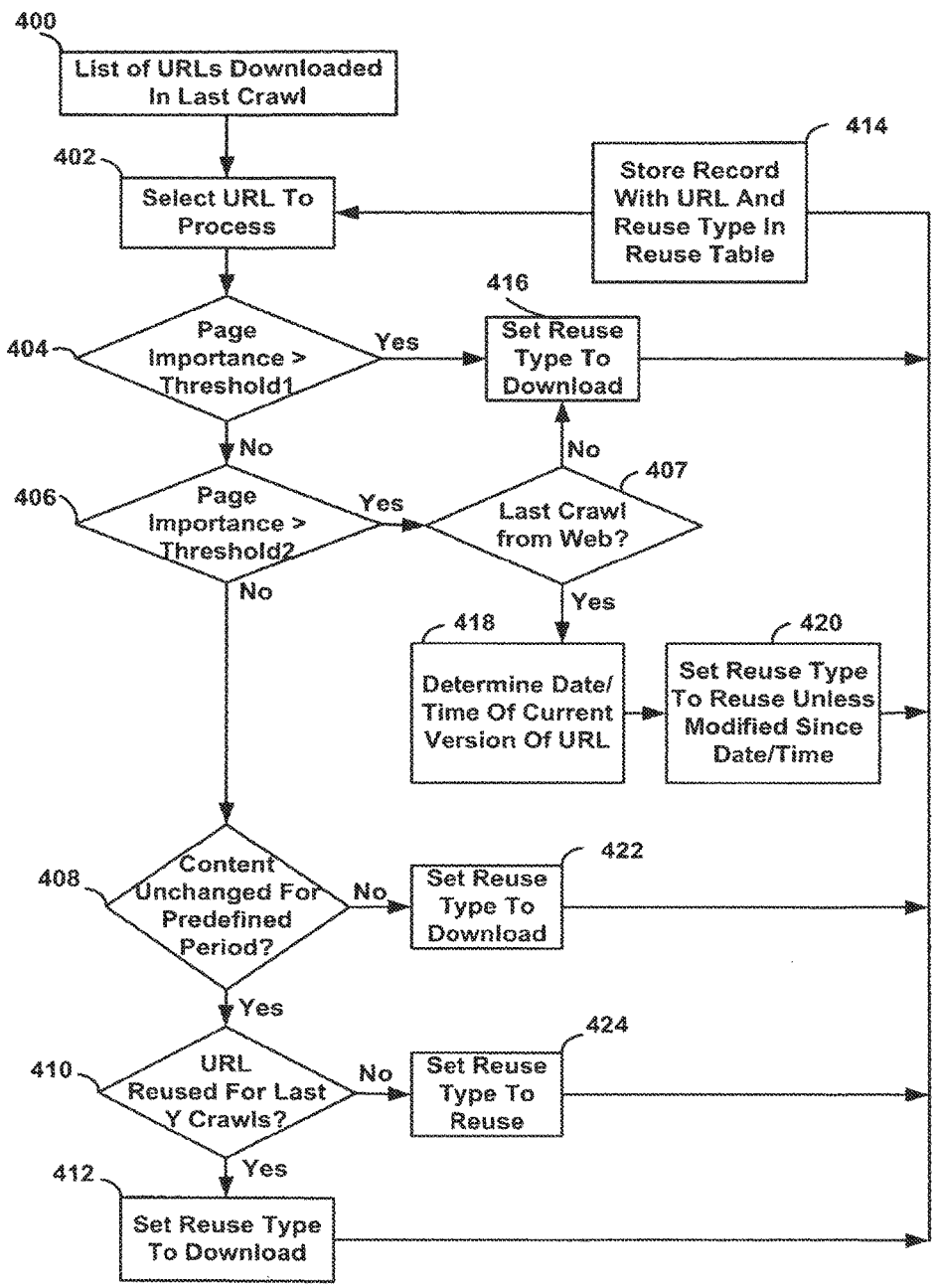
FIG. 4C is a flow diagram of a process for determining which URLs to be download and which to reuse from a database of previously downloaded documents when crawling a set of URLs.

FIG. 4C is a flow diagram of a process for determining whether to download (e.g., from the WWW) or reuse (e.g., retrieve from a repository) a document corresponding to a URL in the next crawl. In some embodiments, the process is performed by the reuse server 307 once per M URL segments. As shown in Table I, each URL is associated with a URL record stored in the reuse table 309. Each URL record includes a Reuse Type flag for determining whether a document will be downloaded or retrieved from a data repository in the next crawl cycle.

The process begins by retrieving 400 from a URL manager 304 a list of URLs downloaded in the last crawl and selecting 402 a URL to process. If 404 the page importance score for the URL is greater than a first predetermined threshold (e.g., a threshold associated with the top x % of page importance scores), then its Reuse Type flag is set 416 to DOWNLOAD and stored 414 in the reuse table 309. The URL page importance score used in steps 404 and 406 can be obtained from the page rankers 222, or can be retrieved from the URL history log 218, or it can be obtained by obtaining the historical page importance score for the URL for a predefined number of prior crawls and then performing a predefined filtering function on those values to obtain the URL page importance score.

If the page importance score of the URL is not above the first predefined threshold, its page importance score is compared against a second predetermined threshold. If 406 the page importance score is greater than the second predetermined threshold (e.g., in the top y % of page ranks), and the last crawl of the document was from the web (i.e., was not a reuse of the document from a local document repository) 407, then the date and time of the current version of the URL is determined 418, the Reuse Type flag is set 420 to REUSE UNLESS MODIFIED SINCE and the determined date and time are also stored in Reuse table entry for the URL. When this URL is scheduled for crawling, the robot assigned this URL will establish a connection to the host, to determine the date and time of the last update to the document at the URL. If the update date and time are after the date and time specified in the reuse table, the robot downloads the document from the host server. Otherwise, the robot reuses the document from a document repository.

On the other hand, if 406 the page importance score is greater than the second predetermined threshold (e.g., in the top y % of page importance scores), and the last crawl of the document was not from the web (i.e., was a reuse of the document from a local document repository) 407, then the Reuse Type Flag is set 416 to Download. After setting the Reuse Type flag, the URL record is stored 414 in the reuse table 309 and another URL is selected 402 from the URL list for processing.

If 404, 406, the page importance score for the URL does not exceed the predetermined thresholds, and if 408 the content of the document associated with the URL has changed at least one over a predefined period (e.g., the 45 day period ending at the time of the last scheduled crawl of the URL), then the Reuse Type flag is set 422 to DOWNLOAD. In some embodiments, the history logs 218 include a content checksum 440 for the content of a document each time it is downloaded by a robot. By comparing the content checksums for two or more of the downloads of the URL, during a predefined period of time, the reuse server can determine if the document at the URL has changed during that predefined period. After setting the Reuse Type flag, the URL record is stored 414 in the reuse table 309 and another URL is selected 402 from the URL list for processing.

If 408 the content of the URL has remained unchanged for the entire predefined period, and if 410 the URL was reused in all of the last Y crawls, then the Reuse Type flag is set 412 to DOWNLOAD. Otherwise, the Reuse Type flag is set 424 to REUSE. For example, if Y=3, then a URL is reused at most three time in a row. On the other hand, once a document qualifies for reuse, it will be reused for Y successive crawls, after which the reuse server will enabling the document to be downloaded. After setting the Reuse Type flag, the URL record is stored 414 in the reuse table 309 and another URL is selected 402 from the URL list for processing.

In other embodiments, various aspects of the reuse scheduling process may differ from those shown in FIG. 4C and described above. For instance, in some embodiments, all known URLs are assigned a Reuse Type of either Download or Reuse. In these embodiments, the Reuse Type of Reuse If Not Modified Since is not used.

Reuse Server

Figure 4D:
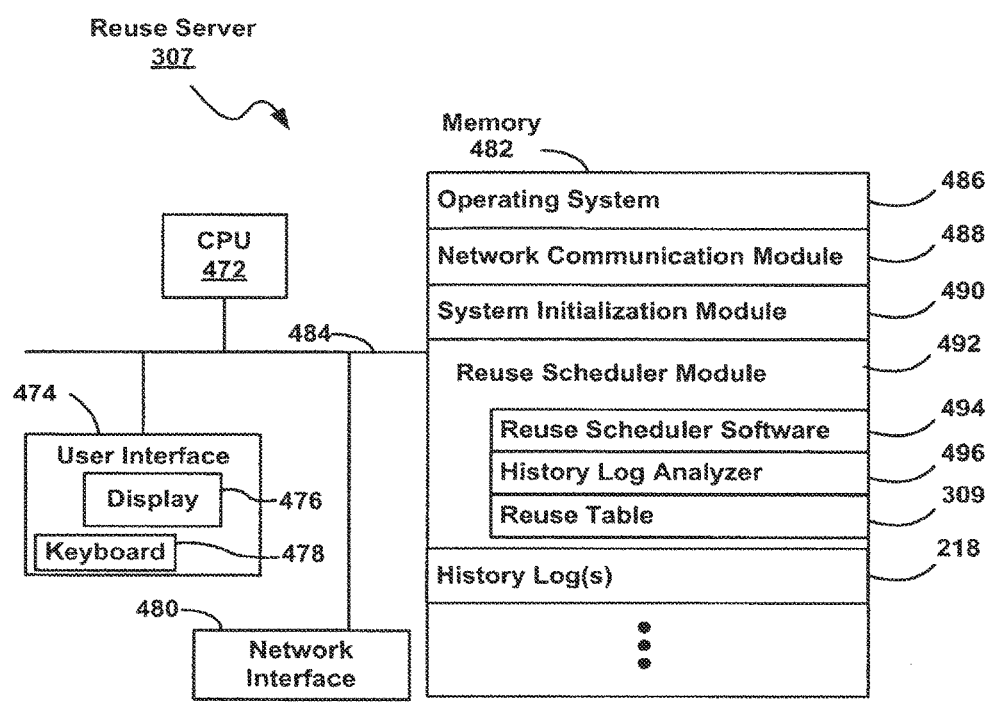
FIG. 4D is a block diagram of a reuse server for a web crawler system.

FIG. 4D is a block diagram of a computer system configured to operate as the reuse server 307. Since reuse scheduling is performed only occasionally, the computer system 307 may well be used for other tasks as well. For the purposes of the present discussion, however, we are concerned only about the computer system while it is configured for use as a reuse scheduler 307.

The reuse scheduler 307 includes one or more processing units (CPU's) 472, one or more network or other communications interfaces 480, memory 482, and one or more communication buses 484 for interconnecting these components. The system 307 may optionally include a user interface 474, for instance a display 476 and a keyboard 478. Memory 912 may include high speed random access memory and may also include non-volatile memory, such as one or more magnetic disk storage devices. Memory 482 may include mass storage that is remotely located from the central processing unit(s) 472.

The memory 482 stores an operating system 486 (e.g., Linux or Unix), a network communication module 480, a system initialization module 490 and a reuse scheduler module 492. The operating system 486 generally includes procedures for handling various basic system services and for performing hardware dependent tasks. The network communication module 488 is used for connecting the system 307 to other servers or computers in the web crawler system 300 (FIG. 3) and possibly to other servers or computers via one or more communication networks (wired or wireless), such as the Internet, other wide area networks, local area networks, metropolitan area networks, and the like. The system initialization module 490 initializes other modules and data structures stored in memory 484 required for the appropriate operation of the system 307.

The operation of the reuse scheduler module 492 was described above with respect to FIG. 4C. The reuse scheduler module 492 includes reuse scheduler software 494, which is used to implement the main logic of the reuse server, a history log analyzer 496 and the reuse table 309. The history log analyzer 496 is configured to analyze the information in one or more history log file(s) 218 to determine (A) whether the content of a particular URL has remain unchanged for a predefined or specified period of time, and (B) whether a particular URL has been reused Y times in a row.

URL FP Mapping and Schedule Output File Format

Figure 5:
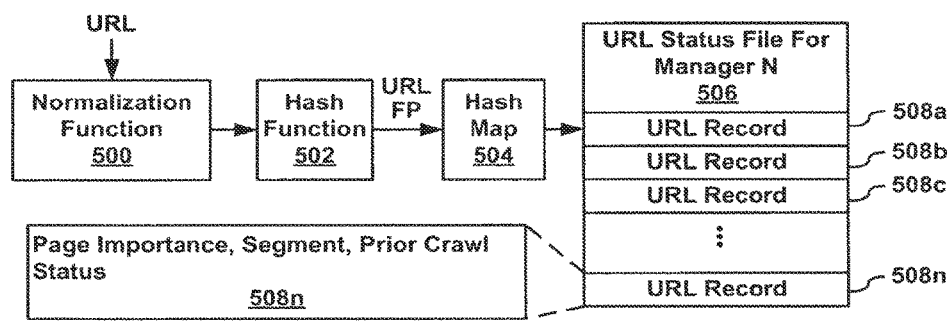
FIG. 5 illustrates a URL fingerprint hashing process for accessing records in a URL status file.
Figure 8:
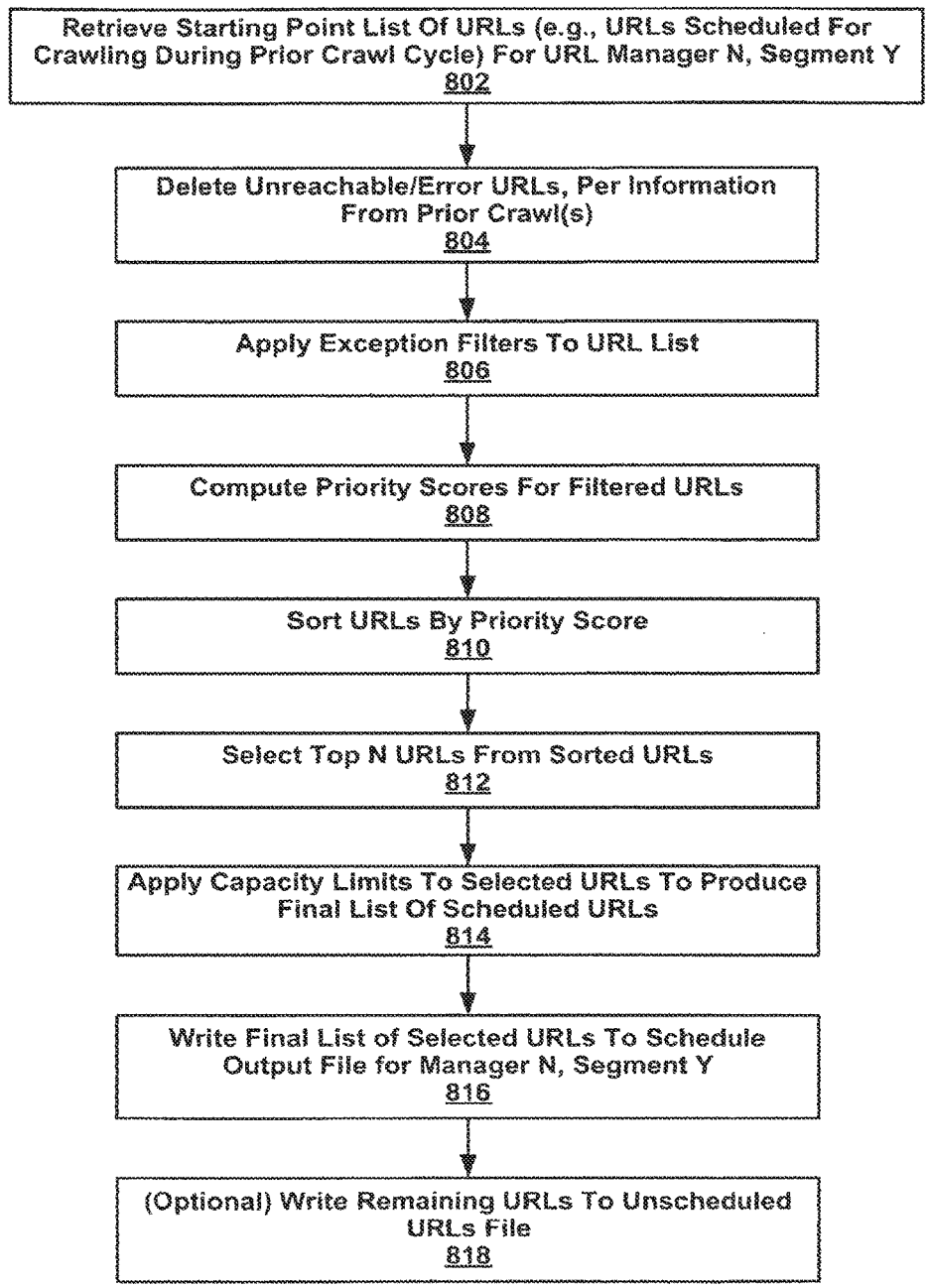
FIG. 8 is flow diagram of a URL scheduler process.

FIG. 5 illustrates a URL FP hashing process for accessing records containing data used in the distributed scheduler process described with respect to FIG. 8. In some embodiments, the URL FP is an N-bit number (where N is a value or a bit length) that is generated from the corresponding URL by first normalizing 500 the URL text (e.g., converting host names to lower case, and canonicalization—rewriting the URL, if necessary, in canonical form) and then passing the normalized URL text through a hash function 502 to produce a URL fingerprint. The URL fingerprint is then passed through a hash map 504, which ensures that the URL fingerprint is well distributed across the entire space of possible numbers. The hash map 504 maps the URL fingerprint to a corresponding record 508 in the URL status file 506. In some embodiments, the URL records 508 include a page importance score, a prior crawl status and a segment ID. In other embodiments, URL records 508 can include more or fewer fields than shown in FIG. 5, as needed, depending upon the architecture of the system 300.

A page importance score is assigned to a URL FP at the time the document download operation is performed or attempted. The page importance score can change over time, as the set of pages having links to the page corresponding to URL FP changes, and as the page importance scores of these referring pages change. The prior crawl status can include multiple fields, including without limitation an error field and an unreachable field. The error field records information associated with a download error. An example of an error is "HTTP Error 4xx." which may indicate that the web page does not exist, or that access is not authorized, or some other error. In some embodiments, the error field indicates the number of consecutive times an attempt to download the URL resulted in an error. The unreachable field records information associated with a URL being unreachable (e.g., because the host server is busy). For example, the unreachable field can include the number of consecutive times the URL was unreachable in previous crawls. The segment ID identifies the particular crawl segment associated with the URL FP at the time that the document download operation was performed or attempted.

In some embodiments, information about document download errors and unreachable URLs is stored in one or more separate files (hereinafter called URL Error Files). For example, for each complete segment crawl, a first file may be created for each URL scheduler that indicates all the URLs scheduled by that URL scheduler which resulted in downloading error, and a second file may be created for each URL scheduler that indicates all the URLs scheduled by that URL scheduler that were determined to be unreachable. The information in these files is then used by the URL scheduler while determining which URLs to schedule for downloading in a next crawl cycle.

Figure 6:
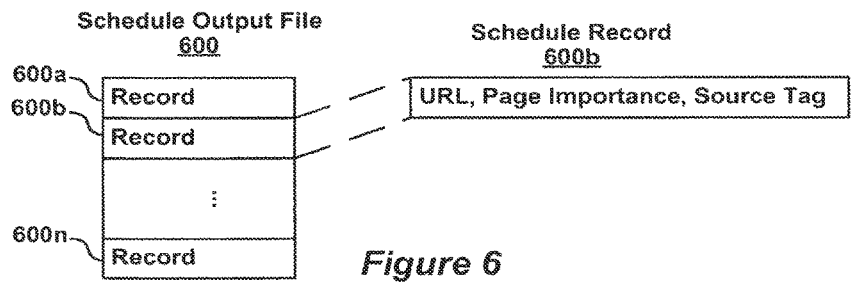
FIG. 6 illustrates the format of a schedule output file.

FIG. 6 illustrates the format of a schedule output file 600. In some embodiments, the result of the scheduler process shown in FIG. 8 is a schedule output file 600, which is provided by a scheduler 302 to its corresponding URL manager 304. The scheduler output file 600 includes records 600a, ..., 600n, each identifying a URL to be crawled and, optionally, including additional information (e.g., page importance score, source tag, etc.).

URL Scheduler Computer System

Figure 7:
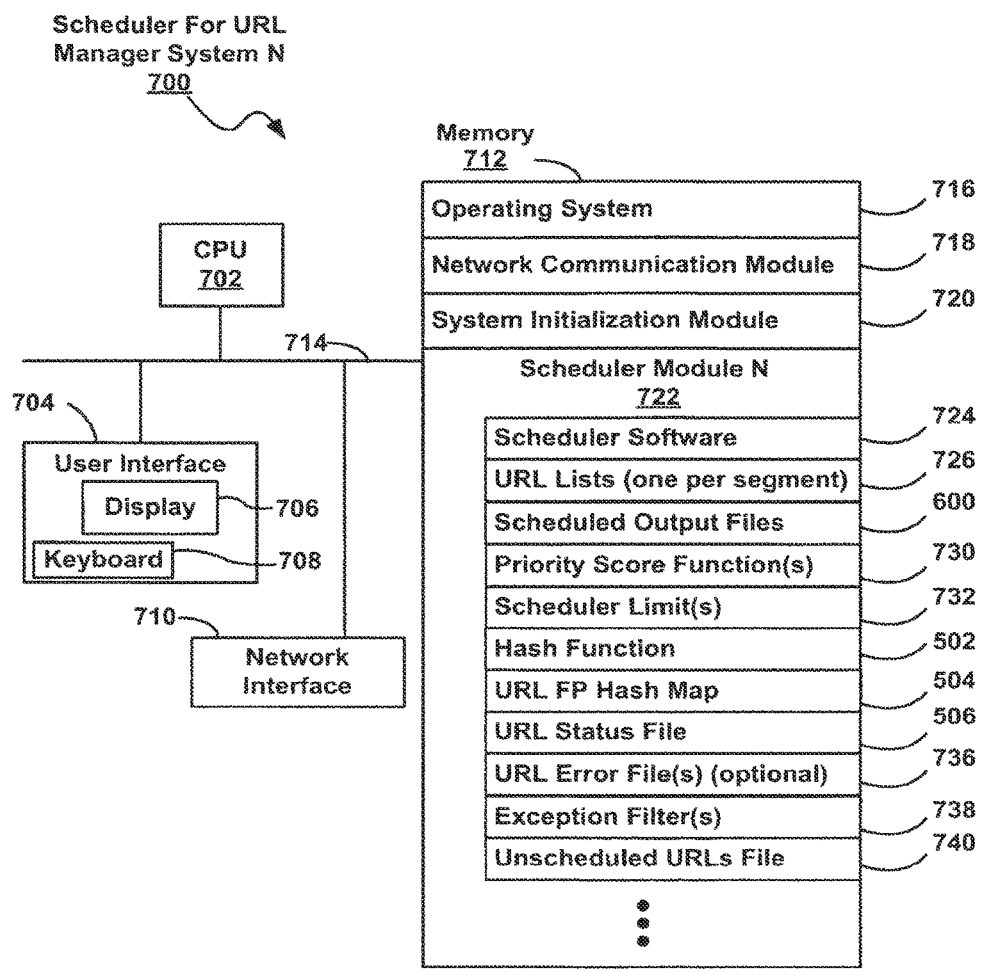
FIG. 7 is a block diagram of a URL scheduler for a URL manager system.

FIG. 7 is a block diagram of a computer system 700 configured to operate as one of the URL schedulers. Since URL, schedule is performed only occasionally, the computer system 700 may well be used for other tasks as well. For the purposes of the present discussion, however, we are concerned only about the computer system 700 while it is configured for use as a URL scheduler.

The URL scheduler 700 includes one or more processing units (CPU's) 702, one or more network or other communications interfaces 710, memory 712, and one or more communication buses 714 for interconnecting these components. The system 700 may optionally include a user interface 704, for instance a display 706 and a keyboard 708. Memory 712 may include high speed random access memory and may also include non-volatile memory, such as one or more magnetic disk storage devices. Memory 712 may include mass storage that is remotely located from the central processing unit(s) 702.

The memory 712 stores an operating system 716 (e.g., Linux or Unix), a network communication module 718, a system initialization module 720 and a URL scheduler module 722. The operating system 716 generally includes procedures for handling various basic system services and for performing hardware dependent tasks. The network communication module 718 is used for connecting the system 700 to other servers or computers in the web crawler system 300 (FIG. 3) and possibly to other servers or computers via one or more communication networks (wired or wireless), such as the Internet, other wide area networks, local area networks, metropolitan area networks, and the like. The system initialization module 720 initializes other modules and data structures stored in memory 714 required for the appropriate operation of the system 700.

The memory 712 also includes a URL scheduler module 722, which is used to implement various aspects of the disclosed embodiments, as described below with respect to FIG. 8. The scheduler module 722 includes scheduler software 724, which is used to implement the various aspects of the scheduler system 700, together with various data structures and functions. In some embodiments, the data structures and functions include a URL list 726 (e.g., one per segment), a schedule output file 600, a priority score function 730, scheduler limits) 732, a hash function 502, a URL FP hash map 504, a URL status file 506, exception filter(s) 738, and a Unscheduled URLs file 740. The data structures may optionally include one or more URL Error Files 736, for storing information about errors and unreachable URLs encountered in one or more prior crawl epochs. The use of these data structures and functions is described with respect to FIG. 8.

Scheduler Operation

FIG. 8 is a flow diagram of a URL scheduling process implemented by a scheduler module N corresponding to a URL manager N and segment Y. For each segment Y to be crawled, the scheduler 724 retrieves 802 a starting point URL list 726 from URL manager N for segment Y. The URL list 726 includes URLs in segment Y that were scheduled for crawling during a prior crawl cycle. As described with respect to FIG. 5, the URLs are passed through the hash function 733 to generate URL fingerprints which are passed through the hash map 734 to access URL records in the URL status file 506. At this point in the process, the prior crawl status fields (e.g., unreachable and error fields) in the URL status file 506 can be used to identify URLs that were unreachable in each of the last X crawls (e.g., the last two crawls) or that associated with download errors in each of the last X crawls. Alternately, in some embodiments prior crawl error information is retrieved from separate URL Error Files. The identified URLs are removed 804 from the starting URL list 726. In some embodiments, one or more exception filters 738 can be applied 806 to the URL list 726 to eliminate URLs. For example, in some embodiments URLs associated with customer complaints or spammers, as well as URLs that do not belong in segment Y, are deleted from the URL list 726. In other embodiment, more or fewer exception filters are applied to the URL list, to remove URLs from the initial URL list.

After deleting URLs from the URL list 726, the page importance scores for the remaining URLs are used to compute 808 priority scores using a priority score function 730, which in some embodiments is given by $$\text{Priority Score}_i = \text{page\_importance}_i * \text{boost factor}_i \quad (1)$$

where the subscript i denotes an ith URL and the boost factor is a scalar (e.g., a number larger or smaller than 1.0) that is used to demote or promote the priority score of the URL. For example, the boost factor can be used to promote URLs of homepages of major companies (e.g., Fortune 100) or popular news sites (e.g., CNN). Note that more or fewer priority scores can be computed using a variety of priority functions, as needed, depending upon the architecture of the scheduling system 300.

After computing 808 the priority scores for the URLs, the URLs are sorted 810 by priority score and the top N sorted URLs are selected 812 as candidates to be crawled. In some embodiments, the number N may be a predefined number, related to the URL handling capacity of the web crawling system during each epoch. For example, N may be equal to a predefined percentage (e.g., 65% or 75% or 80%) of the URL handling capacity of the web crawling system during an epoch.

In some embodiments, one or more scheduler limits 732 (e.g., capacity limits) can be applied 814 to the selected URLs. Some examples of scheduler limits 732 include values that represent the maximum number of URLs that can be scheduled on a host-by-host, domain and/or group basis. For example, there may be hardware or software limits on the number of URLs that a particular host machine can process in a crawl cycle or epoch. There may also be limits on the number of URLs having a particular domain name or that are associated with a particular file type (e.g., CGI files). Note that any number and types of scheduler limits 732 can be applied to the selected URLs, as needed, depending upon the architecture of the scheduler system 300.

After applying 814 the scheduler limits 732 (if any), the selected URLs are written 816 to a schedule output file 728, as shown in FIG. 6. In some embodiments, only URLs are written 816 to the schedule output file 728. In other embodiments, the URLs are written 816 to the schedule output file 728, together with other information (e.g., page importance score, source tag, etc.), as needed, depending upon the architecture of the scheduler system 300. In some embodiments, the URLs that were not written 816 to the schedule output file 728 because they were eliminated due to the scheduler limits 732, are optionally written 818 to an unscheduled URL file 740.

Referring again to FIG. 3, the schedule output file 728 produced by the URL scheduler of FIG. 7 is used by a corresponding to URL manager 304. In particular, the URLs listed in the schedule output file 728 are provided to the URL server 306 over the course of a crawl epoch, for either downloading or reuse, as specified by the reuse table 309. Additional URLs discovered during the course of the crawl are also provided by the URL manager 304 to the URL server 306 using additional mechanisms that are not the subject of this document.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a computing system having one or more processors and memory storing one or more programs executed by the one or more processors:
        retrieving a plurality of records corresponding to prior scheduled crawls of respective documents in a plurality of documents; and
        performing a document crawling operation on the plurality of documents, wherein the document crawling operation includes downloading a current version of a respective document from a host computer based on a determination that a document importance score for the respective document exceeds a first threshold, wherein the document importance score is based on a query-independent metric of an importance of the document for a search engine, or reusing a previously downloaded version of a respective document in the plurality of documents instead of downloading a current version of the respective document from a host computer based on a determination that the document importance score does not exceed a first threshold.

2. The method of claim 1, wherein the plurality of records for a respective document include:
    a first record including a first document identifier and a first crawl time for the respective document, and
    a second record including a second document identifier and a second crawl time for the respective document,
    wherein the first document identifier and the second document identifier correspond to the respective document, and
    wherein performing the document crawling operation on the plurality of documents further includes, when the document importance score does not exceed the first threshold:
        reusing a previously downloaded version of a respective document in the plurality of documents instead of downloading a current version of the respective document from a host computer when a difference between the first crawl time and a second crawl time does not exceed a second threshold, or
        downloading a current version of the respective document from the host computer when a difference between the first crawl time and a second crawl time exceeds the second threshold.

3. The method of claim 1, further comprising:
    retrieving, from a first database, at least a subset of contents of a first document in the plurality of documents, the first document corresponding to a document identifier in a first scheduler record, the first scheduler record including a reuse flag for the first document set to a first state; and
    retrieving, from a second database, at least a subset of contents of a second document in the plurality of documents, the second document corresponding to a document identifier in a second scheduler record, the second scheduler record including a reuse flag for the second document set to a second state;
    wherein the first and second databases are not the same and wherein the second database stores content from previously crawled documents, including the second document.

4. The method of claim 3, wherein the first database includes a set of servers and the set of servers is interconnected by a network.

5. The method of claim 3, wherein the first database includes the World Wide Web.

6. The method of claim 3, wherein the first database includes a subset of the World Wide Web.

7. The method of claim 3, further comprising adding the at least a subset of the contents of the first document to the second database.

8. The method of claim 1, wherein the document importance score associated with the document is based, at least in part, on a number of other documents that reference the document.

9. A computer system comprising:
    one or more processors;
    memory storing data and one or more programs executed by the one or more processors, the stored data and the one or more programs comprising instructions for:
        retrieving a plurality of records corresponding to prior scheduled crawls of respective documents in a plurality of documents; and
        performing a document crawling operation on the plurality of documents, wherein the document crawling operation includes downloading a current version of a respective document from a host computer based on a determination that a document importance score for the respective document exceeds a first threshold, wherein the document importance score is based on a query-independent metric of an importance of the document for a search engine, or reusing a previously downloaded version of a respective document in the plurality of documents instead of downloading a current version of the respective document from a host computer based on a determination that the document importance score does not exceed a first threshold.

10. The computer system of claim 9, wherein the plurality of records for a respective document include:
    a first record including a first document identifier and a first crawl time for the respective document, and
    a second record including a second document identifier and a second crawl time for the respective document, wherein the first document identifier and the second document identifier correspond to the respective document, and wherein performing the document crawling operation on the plurality of documents further includes, when the document importance score does not exceed the first threshold:

reusing a previously downloaded version of a respective document in the plurality of documents instead of downloading a current version of the respective document from a host computer when a difference between the first crawl time and a second crawl time does not exceed a second threshold, or downloading a current version of the respective document from the host computer when a difference between the first crawl time and a second crawl time exceeds the second threshold.

11. The computer system of claim 9, the stored data and the one or more programs comprising instructions for:

retrieving, from a first database, at least a subset of contents of a first document in the plurality of documents, the first document corresponding to a document identifier in a first scheduler record, the first scheduler record including a reuse flag for the first document set to a first state; and retrieving, from a second database, at least a subset of contents of a second document in the plurality of documents, the second document corresponding to a document identifier in a second scheduler record, the second scheduler record including a reuse flag for the second document set to a second state;

wherein the first and second databases are not the same and wherein the second database stores content from previously crawled documents, including the second document.

12. The computer system of claim 11, wherein the first database includes a set of servers and the set of servers is interconnected by a network.

13. The computer system of claim 11, wherein the first database includes the World Wide Web.

14. The computer system of claim 11, wherein the first database includes a subset of the World Wide Web.

15. The computer system of claim 11, the stored data and one or more programs further comprising instructions for adding the at least a subset of the contents of the first document to the second database.

16. The computer system of claim 9, wherein the document importance score associated with the document is based, at least in part, on a number of other documents that reference the document.

17. A non-transitory computer-readable storage medium having stored thereon instructions which, when executed by one or more processors of a computer system, cause the one or more processors to perform operations of:

retrieving a plurality of records corresponding to prior scheduled crawls of respective documents in a plurality of documents; and performing a document crawling operation on the plurality of documents, wherein the document crawling operation includes downloading a current version of a respective document from a host computer based on a determination that a document importance score for the respective document exceeds a first threshold, wherein the document importance score is based on a query-independent metric of an importance of the document for a search engine, or reusing a previously downloaded version of a respective document in the plurality of documents instead of downloading a current version of the respective document from a host computer based on a determination that the document importance score does not exceed a first threshold.

18. The non-transitory computer-readable storage medium of claim 17, wherein the plurality of records for a respective document include:

a first record including a first document identifier and a first crawl time for the respective document, and a second record including a second document identifier and a second crawl time for the respective document, wherein the first document identifier and the second document identifier correspond to the respective document, and wherein performing the document crawling operation on the plurality of documents further includes, when the document importance score does not exceed the first threshold:

reusing a previously downloaded version of a respective document in the plurality of documents instead of downloading a current version of the respective document from a host computer when a difference between the first crawl time and a second crawl time does not exceed a second threshold, or downloading a current version of the respective document from the host computer when a difference between the first crawl time and a second crawl time exceeds the second threshold.

19. The non-transitory computer-readable storage medium of claim 17, wherein the instructions, when executed by the one or more processors, cause the one or more processors to perform operations of:

retrieving, from a first database, at least a subset of contents of a first document in the plurality of documents, the first document corresponding to a document identifier in a first scheduler record, the first scheduler record including a reuse flag for the first document set to a first state; and retrieving, from a second database, at least a subset of contents of a second document in the plurality of documents, the second document corresponding to a document identifier in a second scheduler record, the second scheduler record including a reuse flag for the second document set to a second state;

wherein the first and second databases are not the same and wherein the second database stores content from previously crawled documents, including the second document.

* * * * *